United States Patent [11] 3,627,656

[72] Inventors Leroy J. Miller
 Canoga Park;
 John B. Rust, Los Angeles, both of Calif.
[21] Appl. No. 813,305
[22] Filed Apr. 3, 1969
[45] Patented Dec. 14, 1971
[73] Assignee Hughes Aircraft Company
 Culver City, Calif.

[54] CATALYST SYSTEMS FOR PHOTO-CHEMICAL POLYMERIZATION
 9 Claims, No Drawings
[52] U.S. Cl. .................................................. 204/159.24,
 96/89, 96/115 P, 204/159.23, 252/188.3, 252/431
 P, 252/431 R, 252/437, 252/438, 252/439
[51] Int. Cl. .................................................. C08d 1/00,
 C08f 1/16
[50] Field of Search ............................................ 96/115;
 204/159.23, 159.24

[56] References Cited
UNITED STATES PATENTS

| | | | |
|---|---|---|---|
| 3,352,772 | 11/1967 | Mao .............................. | 204/159.24 |
| 3,097,096 | 7/1963 | Oster ............................ | 96/30 |
| 3,047,422 | 7/1962 | Sites et al. .................... | 117/93 |
| 2,989,455 | 6/1961 | Neugebauer et al. ......... | 204/159.23 |
| 2,875,047 | 2/1959 | Oster ............................ | 204/159.23 |

Primary Examiner—Murray Tillman
Assistant Examiner—Richard B. Turer
Attorneys—James K. Haskell and Alton V. Oberholtzer ABSTRACT: An improvement in the method of effecting polymerization and particularly visible light photopolymerization of photopolymerizable ethylenic systems, or compositions thereof, by the use of a mixture of a selective combination of photo-oxidant dye material and catalyst cooperative therewith in initiating polymerization in combination with a light sensitizing activator to induce the reaction of said selective combination and to effect more rapid polymerization, and compositions thereof and therefor.

CATALYST SYSTEMS FOR PHOTO-CHEMICAL POLYMERIZATION

This invention relates to a discovery and an improvement in a new method of effecting polymerization and compositions therefor. The method provides a more rapid rate of initiating photopolymerization of polymerizable systems comprised of ethylenically unsaturated compounds, by sensitizing the reaction of a photo-oxidant and catalyst combination which causes polymerization, and products therefor and thereof. More particularly, the present invention relates to a method of selectively utilizing a photo-active agent, as a dye material, essentially incapable of initiating polymerization by itself or of acting as a photo-oxidant, but capable of acting as a sensitizer of a polymerization-effecting combination of a photo-oxidant and a catalyst therefor. The polymerization effecting combination, of the dye material and catalyst, receives energy from said selective photo-active agent and thereby becomes able to initiate rapid photopolymerization therewith, or initiate polymerization by said combination upon exposure to light of different wavelengths from that absorbed effectively by the photo-oxidant.

PRIOR ART

Photopolymerization of photopolymerizable systems, as photopolymerizable ethylenically unsaturated monomers and polymers with a photosensitive dye and reducing agent therefor is known to the art. Dyes are utilized in these systems to sensitize and effect the polymerization reactions under conditions of illumination by visible light. However, in normally visible light these polymerization reactions usually proceed very slowly and are time consuming. A more rapid method of forming a photopolymer has been described in the prior application of John B. Rust, Ser. Nos. 450,397 and 483,986, now abandoned and replaced by application Nos. 824,902, now Pat. No. 3,573,922, and 824,903, by providing a photo-oxidant dye material and catalyst mixture combination capable of effecting the production of free radical initiators by the absorption of visible light. Consequently, previous mention of dyes and mixtures thereof has been made from the standpoint of their independent photosensitivity in initiating or making more efficient use of the entire spectrum of visible light for photopolymerization. Thus, each must be desensitized individually to prevent further polymerization after the initiated photopolymerization, in order to retain a photopolymer copy therein.

The monomers, polymers and mixtures thereof, providing polymerizable systems and of a polymerizable character, are mono and polyfunctional compounds generally termed vinyl compounds. Such polymerizable compounds are typified by styrene, butadiene, vinyl chloride, vinylidene chloride, acrylic acid, acrylamide, acrylonitrile, N (hydroxyethyl) acrylamide, methacrylic acid, calcium diacrylate, barium diacrylate, methacrylamide, vinyl acetate, methyl methacrylate, ethyl acrylate, vinyl benzoate, vinyl pyrrolidone, vinyl methyl ether, vinyl butyl ether, vinyl butyrate, N,N'-alkylenebisacrylamides, secondary acrylamides, tertiary acrylamides, mono, di-, or trivalent metal salts of the above acids, and mixtures thereof, including such polymerizable materials and coatings thereof as known to the art.

The dyes utilized in this prior discovery and described as photo-oxidants or photo-oxidant dyes preferably having the general structural formula:

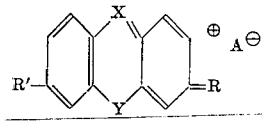

In this formula, R carries a positive charge and is an imonium, alkylimonium, dialkylimonium, or oxonium group, R' is hydrogen or an amino, alkylamino, dialkylamino, or hydroxyl group; X is nitrogen or substituted carbon; Y is sulfur, oxygen or substituted nitrogen, and A is any suitable anion. Of the dyes having the above structure, those having the best photo-oxidant characteristics, and the best for illustrative purposes herein, are the phenothiazine dyes, which have the following structure:

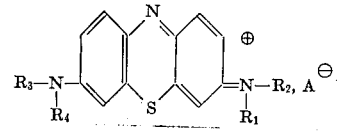

These dyes differ primarily in the $R_1$, $R_2$, $R_3$, and $R_4$ groups, which may be hydrogen or alkyl groups (usually one to five carbon atoms). Other substituents may also be present on the aromatic nucleus in addition to those shown. These phenothiazine dyes are generally blue or purple and absorb most strongly visible light in the yellow, orange, and red regions of the spectrum, or in the wavelength region, or frequency range, of from about 5700 A. to about 7000 A. Concentration is preferably on the order of $10^{-2}$ mole to $10^{-7}$ mole of photo-oxidant dye material per liter of the photopolymerizable composition for imaging of photocopy therein. The catalyst portion is preferably in relatively or substantially equal molecular proportion thereto, although more or less of each, including catalyst, can be utilized as the particular polymerizable system and results desired are technically considered relative to the different combinations that may be provided for effecting polymerization.

The catalysts, in the photoredox combination are preferably organic sulfinic compounds, triorgano arsines or triorgano phosphines, including the soluble metal salts and alkyl and aryl esters of sulfinic acids and adducts of sulfinic acids with aldehydes. These catalysts in combination with the photo-oxidant dye function as photoredox catalyst systems for effecting photopolymerization of photopolymerizable ethylenic systems and particularly monomers. Therein the dye is an oxidant component, which is inactive in its electronic ground state (in the dark at normal temperatures) but is an oxidant in its photo-excited state. Illustrative of the preferred catalyst are: p-toluenesulfinic acid, benzenesulfinic acid, p-bromobenzenesulfinic acid, naphthalenesulfinic acid, 4-acetamidobenzenesulfinic acid, 5-salicylsulfinic acid, ethanesulfinic acid, 1,4-butanedisulfinic acid, α-toluenesulfinic and the like. The salts of these acids are the soluble sodium, potassium, lithium, barium, silver, zinc, and aluminum salts and the like. Appropriate esters are methyl, ethyl, propyl, butyl, benzyl, naphthyl, and the like and the adducts are formed with formaldehyde, acetaldehyde, isobutyraldehyde, heptaldehyde and the like, and suitable mixtures of the above. Triogano-arsines of the character of

and triorgano-phosphines of the character of

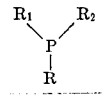

where R, $R_1$, and $R_2$ may be alkyl, aryl, alkaryl, and aralkyl groups may be employed. Such triorgano compounds are exemplified by tributylphosphine or arsine, triphenylphosphine or arsine, dibutylphenylphosphine or arsine, methyldiphenylphosphine or arsine and trioctylphosphine or arsine, including mixtures of the same.

Concentration of the catalyst is preferably on the order of $10^{-2}$ to $10^{-6}$ moles per liter in a photosensitive combination.

Great speed is normally of the essence in obtaining imaging copy in photopolymerizable systems of ethylenically unsaturated compositions of monomer materials. When the compositions are exposed to imaging visible light in the region of the spectrum or frequency range of about 3800 A. to about 7200 A. the said light containing a combination of violet, blue, green, yellow, orange and red wavelengths, it has been discovered that a faster reaction is obtained by combining a photosensitive sensitizer material which is normally relatively inactive as a photo-oxidant, but which absorbs light in the visible range. Such material functions essentially as an initiator of reactions between said photoredox catalyst, system. The proper combination of photo-oxidant and catalyst, when activated by the sensitizing dye material, or a combination thereof, in visible light absorbed poorly by the photo-oxidant but strongly by the sensitizer, initiates photoimaging polymerization and causes it to proceed in less time than would otherwise be required. That is, the time of effecting photopolymerization by photoimaging is measurably reduced in the polymer forming composition containing the combination of photo-oxidant dye material and catalyst with a sensitizer preferentially reactive therewith when the photo-imaging light is of a wavelength absorbed by the sensitizer, but not absorbed, or absorbed only weakly by the photo-oxidant. For example, by employing an active photo-oxidant dye material such as phenothiazine dyes which are generally blue or purple and absorb visible light most strongly in the yellow, orange and red regions, or in the 5700 A. to 7200 A. region, a rapid photopolymerization is effected with light of these wavelengths. However, when blue and/or green light or light in the wavelength range of about 4000 A. to 5700 A. is present, or are predominant factors, the photosensitive compositions which contain the phenothiazine dyes are less efficient, failing to properly use the light in the lower wavelength ranges. Thus, the present invention provides an improvement in the method of utilizing the lower ranges, as the blue and green portions, of the visible spectrum in initiating polymerization by using a photoredox catalyst system combination containing a photoactive sensitizer therefor, as embodied herein, for effecting more rapid photopolymerization the photopolymerizable composition is irradiated with radiation in and about the 4000-5700 A. range, or with white light composed of a composite mixture of light including that in the wavelength range of about 4000 to about 5700 A.

In addition, the present invention also provides for a mixture of light-active photo-oxidant dyes or dye materials, wherein the individually active photopolymerization effecting photo-oxidant is preferably of the family of phenothiazine dyes capable of reacting with the catalyst when activated by light in the higher wavelength range of about 5700 A. and higher. Removing or inactivating this photo-oxidant material desensitizes the entire composition to visible light. However, the method herein is primarily related to increasing the rate of photoinduced polymerization of polymerizable systems and preferably polymerizable monomer systems catalyzed by a photoredox catalyst system comprised of a photo-oxidant material and a catalyst material. This method comprises incorporating as a part of the catalyst system a sensitizer material which normally cannot function as a photo-oxidant in the photoredox-catalyst system, and which cannot initiate polymerization by itself, but which absorbs light and transfers this absorbed energy to the photo-oxidant which is capable of using this energy to initiate polymerization. This causes polymerization to proceed in a more rapid manner than is possible with the photo-oxidant and catalyst combination, alone.

In the method and compositions herein described and illustratively provided, the added sensitizer which is inactive as a photo-oxidant accelerates the reaction rate of the polymerization effecting photo-oxidant and catalyst material because it absorbs light energy which is otherwise not available to the active photo-oxidant material and transfers it to the active photo-oxidant and catalyst mixture. As exemplified, it is essential that the additional sensitizing material have a color or sensing characteristic which is different from that of the photo-oxidant material, particularly in the photo-oxidant catalyst combination. Since the best active photo-oxidants are dyes of the family of phenothiazines (which are purple or blue, such as methylene blue, thionine azure B, methylene green, etc. and mixtures of the same), the added sensitizing initiator therefor, as a dye should be red, orange, or yellow, or mixture thereof. Dyes which are suitable for this purpose include eriochrome cyanine R, rhodamine B, acridine red, and mixtures of the same.

The following are nonlimiting examples, illustrative of the concept, improvements and discoveries embodied in the present invention or improvement in the art of photopolymerization of polymerizable system.

SOLUTION A

Freshly distilled acrylic acid (72 ml.) was added to a solution of barium hydroxide octahydrate (157.5 g.) in water (157.5 ml.) and the mixture was heated at 60°–80° C. for 2 hours. A small quantity of insoluble material was removed by filtration.

SOLUTION B

Sodium p-toluenesulfinate (90+percent) (5.6374 g.) was dissolved in distilled water (250 ml.).

SOLUTION C

Methylene blue was dissolved in water to obtain a solution with a concentration of $1.07 \times 10^{-3}$ moles/liter. The concentration was calculated from the absorbance at 665 mµ using $3.65 \times 10^4$ as the molar extinction coefficient.

SOLUTION D

Eriochrome cyanine R (0.0236 g.) was dissolved in 50 ml. of water. A 20 ml. aliquot was diluted to 50 ml. with water to obtain solution D.

SOLUTION E

Rhodamine B (0.0240 g.) was dissolved in 50 ml. of water. A 20 ml. aliquot was diluted to 50 ml. with water to obtain solution E.

SOLUTION F

Acridine red (0.0138 g.) was dissolved in 50 ml. of water. A 20 ml. aliquot was diluted to 50 ml. with water to obtain solution F.

TABLE 1

| Test solution designation | Volume of solution A, ml. | Volume of solution B, ml. | Dye solutions used | Volume of dye solutions, ml. | Volume of water added, ml. |
|---|---|---|---|---|---|
| G | 4.0 | 0.5 | C | 0.5 | 0.5 |
| H | 4.0 | 0.5 | C / D | 0.5 / 0.5 | None |
| I | 4.0 | 0.5 | D | 0.5 | |
| J | 4.0 | 0.5 | C / E | 0.5 / 0.5 | 0.5 / None |
| K | 4.0 | 0.5 | E | 0.5 | |
| L | 4.0 | 0.5 | C / F | 0.5 / 0.5 | 0.5 / None |
| M | 4.0 | 0.5 | F | 0.5 | 0.5 |

Each of the above test solutions was exposed to light from a 500-watt tungsten filament lamp projected onto the solution. The test solutions were contained between two glass plates separated by a peripheral shim that was 7 mils thick. The amount of light transmitted by the sample was detected with a photomultiplier tube, and the transmitted light was recorded as a function of time. The test was repeated with fresh portions of the test solution and with a light filter in the irradiating beam of light. The filters which were used were identified and sold to the trade as Filtraflex DT RED (98601), Filtraflex DT Green (98607), and Filtraflex DT Blue (986-10). The effect of each dye on the rate of polymerization is apparent from the results shown in tables 2,3, and 4:

TABLE 2.—THE EFFECTS OF ADDING ERIOCHROME CYANINE R

| Test solution designation | Filtraflex DT filter used | Induction period, sec. | Time (sec.) required for transmission to decrease to— | | |
|---|---|---|---|---|---|
| | | | 50% | 25% | 10% |
| G (methylene blue)[1] | None | 9.6 | 16.3 | 22.4 | 40.6 |
| | Red | 12.4 | 20.9 | 28.6 | 48.4 |
| | Green | 46.6 | 65.2 | 80.6 | 107.5 |
| | Blue | 286.2 | 349.7 | 392.1 | 457.6 |
| H (methylene blue plus eriochrome cyanine R).[2] | None | 6.9 | 12.1 | 16.2 | 27.0 |
| | Red | 9.3 | 19.0 | 31.8 | 83.2 |
| | Green | 30.9 | 46.5 | 58.4 | 78.5 |
| | Blue | 156.8 | 220.1 | 263.1 | 335.6 |
| I (eriochrome cyanine R)[3] | None | 12% decrease in transmission after 2,275 sec. | | | |

[1] Methylene blue.
[2] Methylene blue plus eriochrome cyanine R.
[3] Eriochrome cyanine R.

TABLE 3.—THE EFFECT OF ADDING RHODAMINE B

| Test solution designation | Filtraflex DT filter used | Induction period, sec. | Time (sec.) required for transmission to decrease to— | | |
|---|---|---|---|---|---|
| | | | 50% | 25% | 10% |
| G (methylene blue) | None | 7.2 | 12.8 | 17.8 | 35.2 |
| | Red | 9.9 | 18.3 | 30.3 | 71.4 |
| | Green | 38.3 | 53.7 | 65.4 | 85.6 |
| | Blue | 260 | 323 | 361 | 422 |
| J (methylene blue plus rhodamine B). | None | 6.9 | 12.8 | 18.8 | 39.6 |
| | Red | 9.8 | 19.0 | 34.8 | |
| | Green | 32.4 | 46.1 | 57.6 | 76.1 |
| | Blue | 168 | 215 | 251 | 306 |
| K (rhodamine B) | None | 2,154 | 2,523 | 2,706 | 2,974 |

TABLE 4.—THE EFFECT OF ADDING ACRIDINE RED

| Test solution designation | Filtraflex DT filter used | Induction period, sec. | Time (sec.) required for transmission to decrease to— | | |
|---|---|---|---|---|---|
| | | | 50% | 25% | 10% |
| G (methylene blue) | None | 6.3 | 12.1 | 19.9 | 48.2 |
| | Red | 7.6 | 17.4 | 39.7 | |
| | Green | 36.8 | 53.2 | 66.1 | 94.1 |
| | Blue | 251.2 | 304.1 | 339.3 | 391.5 |
| L (methylene blue plus acridine red). | None | 6.1 | 12.3 | 21.1 | 59.8 |
| | Red | 8.4 | 17.9 | 37.6 | 101.6 |
| | Green | 31.7 | 47.6 | 60.4 | 87.7 |
| | Blue | 219.4 | 269.5 | 305.6 | 360.4 |
| M (acridine red) | None | 4,200 | 5,976 | 6,932 | |

An examination of the data in table 2 reveals that the addition of eriochrome cyanine R decreased the period of illumination with white light required by about 26 to 33 percent. With green and blue light, the acceleration of polymerization was somewhat greater, while with red light the effect was more complex, the initial rate being faster than that observed with methylene blue alone. Qualitatively similar, although very much smaller, effects were observed when rhodamine B and acridine red were added to the photosensitive solution.

Tests were made on the following dyes which were found to be inactive in the present invention:

pyronin B, neutral red, alizarin yellow R, titan yellow, alizarin red S, methyl orange, acid fuchsin, thioflavin T, erythrosin B, basic fuchsin, phenolsulfonphthalein, orange IV, methyl red, carminic acid, cresol red, nitrophenylazoresorcinol, acridine, orange, safranine O, eosin B, and rose bengal. In each case, mixture with methylene blue caused polymerization to occur either at the same or at a slower rate than methylene blue alone.

Similar tests were also made on acridine yellow, phloxine B, phenosafranine, fluorescein, riboflavin, and proflavin. The admixture of these dyes accelerated the photoinduced polymerization reaction with blue light, and in some cases with white light, but no more than would be anticipated from a summation of the individual rates of polymerization observed when methylene blue and the additional dye were used separately. Thus, these dyes are individually active and can function independently as the dye component of a photoredox catalyst and, in the present invention, in combination with the sensitizing dyes described above.

EXAMPLE II

Solutions $A_1$, $B_1$, $C_1$, similar to solutions A, B, and C, respectively, of example I:

Solution $D_1$:

Eriochrome cyanine R (0.5143 g.) was dissolved in distilled water (50 ml.) An estimated 2 percent of the dye failed to dissolve and was therefor filtered off.

Solution $E_1$:

Rhodamine B (0.5243 g.) was dissolved in distilled water (50 ml.).

Solution $F_1$:

Acridine red (0.0482) was dissolved in water insofar as it was possible. The undissolved material, which was an estimated 10 percent of the dye, was removed by filtration.

Test solutions were prepared from the above solutions as shown in table 5.

TABLE 5

| Test solution designation | Volume of solution A, ml. | Volume of solution B, ml. | Dye solutions used | Volume of dye solutions, ml. | Volume of water added, ml. |
|---|---|---|---|---|---|
| $G_1$ | 4.0 | 0.5 | C | 0.5 | 0.5 |
| $H_1$ | 4.0 | 0.5 | C / D | 0.5 / 0.5 | None |
| $I_1$ | 4.0 | 0.5 | C / E | 0.5 / 0.5 | None |
| $J_1$ | 4.0 | 0.5 | C / F | 0.5 / 0.5 | None |

Each of the above solutions was tested as described in example I. A precipitate formed during the preparation of solution H, and the supernatant solution was used in the test. The results are given in table 6.

TABLE 6

| Test solution designation | Filtraflex DT filter used | Induction period, sec. | Time (sec.) required for transmission to decrease to— | | |
|---|---|---|---|---|---|
| | | | 50% | 25% | 10% |
| $G_1$ (methylene blue) | None | 5.8 | 11.4 | 19.3 | 46.6 |
| | Red | 7.5 | 16.2 | 34.3 | 86.4 |
| | Green | 32.2 | 47.0 | 57.8 | 77.0 |
| | Blue | 205.6 | 258.1 | 297.0 | 348.0 |
| $H_1$ (methylene blue plus eriochrome cyanine R). | None | 4.7 | 9.0 | 12.6 | 22.2 |
| | Red | 6.9 | 13.3 | 20.4 | 43.4 |
| | Green | 24.0 | 37.7 | 46.8 | 59.6 |
| | Blue | 157.4 | 231.0 | 268.2 | 319.6 |
| $I_1$ (methylene blue plus rhodamine B). | None | 7.3 | 11.7 | 15.4 | 23.3 |
| | Red | 26.4 | 41.0 | 52.6 | 74.2 |
| | Green | 24.8 | 33.8 | 51.8 | 77.2 |
| | Blue | 120.8 | 160.8 | 187.2 | 225.6 |
| $J_1$ (methylene blue plus acridine red). | None | 5.9 | 10.8 | 16.3 | 35.0 |
| | Red | 9.2 | 18.4 | 32.2 | 79.8 |
| | Green | 23.8 | 37.4 | 49.2 | 64.6 |
| | Blue | 155.8 | 205.0 | 230.6 | 267.8 |

As in example I, the acceleration due to the extra dye was greater when blue or green light was used for illumination. At the high concentrations used in this example, rhodamine B and acridine red also interfered with the normal course of the photopolymerization. This was apparent from the retarding effect of these dyes when illumination with red light was used.

EXAMPLE III

Solutions $A_3$, $B_3$, and $C_3$. These solutions were similar to solutions A, B, and C, respectively, in example I.

Solution $D_3$:

Eriochrome cyanine R (0.0235 g.) was dissolved in glycerol (50 ml.).

Solution $E_3$:

Rhodamine B. (0.0241 g.) was dissolved in glycerol (50 ml.).

Solution $F_3$:

Acridine red (0.0138 g.) was dissolved in glycerol (50 ml.). Test solutions were prepared from the above solutions as described in table 7.

TABLE 7

| Test solution designation | Volume of solution A, ml. | Volume of solution B, ml. | Dye solutions used | Volume of dye solutions, ml. | Volume of glycerol added, ml. |
|---|---|---|---|---|---|
| $G_3$ | 4.0 | 0.5 | C | 0.5 | 0.5 |
| $H_3$ | 4.0 | 0.5 | C, D | 0.5, 0.5 | None |
| $I_3$ | 4.0 | 0.5 | C, E | 0.5, 0.5 | None |
| $J_3$ | 4.0 | 0.5 | C, F | 0.5, 0.5 | None |

Each of the above solutions was tested as described under example I. The results are given in table 8.

EXAMPLE IV

Solution $A_4$:

A buffer solution with a pH of 8.0 was prepared by dissolving anhydrous citric acid (0.519 g.) and anhydrous sodium phosphate, dibasic, (27.63 g.) in enough water to make 1000 ml. of solution. Recrystallized acrylamide (90.0 g.) and N,N'-methylenebisacrylamide (13.5 g.) were dissolved in a sufficient quantity of buffer solution to make a monomer solution, solution $A_4$, with a volume of 200 ml.

Solutions $B_4$, $C_4$, $D_4$, and $E_4$:

These solutions were similar to solutions B, C, E, and F, respectively, in example I.

Test solutions were prepared from the above solutions as described in table 9.

TABLE 9

| Test solution designation | Volume of solution A, ml. | Volume of solution B, ml. | Dye solutions used | Volume of dye solutions, ml. | Volume of water added, ml. |
|---|---|---|---|---|---|
| $F_4$ | 4.0 | 0.5 | $C_4$ | 0.5 | 0.5 |
| $G_4$ | 4.0 | 0.5 | $C_4$, $D_4$ | 0.5, 0.5 | None |
| $H_4$ | 4.0 | 0.5 | $D_4$ | 0.5 | 0.5 |
| $I_4$ | 4.0 | 0.5 | $C_4$, $E_4$ | 0.5, 0.5 | None |
| $J_4$ | 4.0 | 0.5 | $E_4$ | 0.5 | 0.5 |

Nitrogen gas containing a maximum of 10 p.p.m. of oxygen was passed through each solution for 15 minutes. The solutions were then illuminated under the same conditions with light from a tungsten lamp passed through a Filtraflex DT Blue (986–10) light filter. The periods of illumination required for gelatin to occur provided in table 10.

TABLE 8

| Test solution designation | Filtraflex DT filter used | Induction period, sec. | Time (sec.) required for transmission to decrease to— | | |
|---|---|---|---|---|---|
| | | | 50% | 25% | 10% |
| $G_3$ (methylene blue) | None | 4.7 | 9.2 | 13.5 | 39.5 |
| | Red | 6.4 | 13.9 | 29.8 | 90.8 |
| | Green | 28.6 | 41.5 | 52.4 | 72.8 |
| | Blue | 211 | 265.9 | 298.7 | 352.7 |
| $H_3$ (methylene blue plus eriochrome cyanine R). | None | 4.0 | 9.6 | 16.9 | 38.4 |
| | Red | 5.5 | 11.9 | 22.2 | 60.4 |
| | Green | 24.2 | 37.7 | 49.0 | 58.8 |
| | Blue | 96.1 | 135.7 | 164.8 | 208.7 |
| $I_3$ (methylene blue plus rhodamine B). | None | 4.3 | 9.4 | 16.2 | 33 |
| | Red | 6.4 | 13.5 | 25.5 | 68.6 |
| | Green | 17.9 | 26.6 | 34.5 | 49.2 |
| | Blue | 99.8 | 140.2 | 166 | 204.4 |
| $J_3$ (methylene blue plus acridine red). | None | 4.2 | 9.9 | 20.4 | 58.4 |
| | Red | 6.1 | 15.4 | 39.3 | 117 |
| | Green | 19.4 | 31.0 | 39.8 | 56.8 |
| | Blue | 106.1 | 154.2 | 187.8 | 239.8 |

TABLE 10

| Test Solution Designation | Period of Illumination (Sec.) Required for gelation |
|---|---|
| E₄ (Methylene blue) | 44 |
| G₄ (Methylene blue plus Rhodamine B) | 31.5 |
| H₄ (Rhodamine B) | No gel after 2100 seconds |
| I₄ (Methylene blue plus Acridine red) | 35 |
| J₄ (Acridine red) | No gel after 1440 seconds |

Having described the present embodiments of our discovery in accordance with the Patent Statutes, it will now be apparent that some modifications and variations may be made without departing from the spirit and scope thereof. The specific embodiments described are provided by way of illustration and are illustrative of our discovery, invention or improvements which are to be limited only by the terms of the appended claims.

What is claimed is:

1. A photopolymerizable vinyl monomer system inactive in the dark and containing a photoredox catalyst combination for photopolymerizing said vinyl monomer over the visible light range of about 3800 to about 7200 A., said catalyst combination comprising:
   a. a catalyst material selected from the group consisting of organic sulfinic compounds, triorgano-substituted arsines and triorgano-substituted phosphines in combination with:
   b. a first photo-oxidant dye weakly absorbing light in a first wavelength range of 4000 to 5700 A. and strongly absorbing light in a second range of from 5700 to 7200 A. to form an activated photoredox catalyst combination capable of polymerizing said monomers said photo-oxidant dye being selected from compounds of the formula:

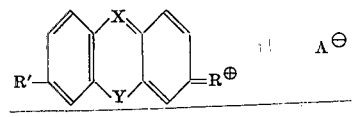

where R carries a positive charge and is selected from imonium, alkylimonium, dialkylimonium and oxonium; R' is selected from hydrogen, amino, alkylamino, dialkylamino, and hydroxyl; X is selected from nitrogen and substituted carbon, Y is selected from sulfur, oxygen and substituted nitrogen and A is an anion; and
   c. an activator for increasing the activity of the combination and rate of polymerization of said vinyl monomer from light in the 4000 to 5700 A. wavelength range comprising a second dye material incapable of forming a photoactive, photoredox catalyst for said monomer in absence of said first dye, but in presence of said first dye and catalyst material redox combination strongly absorbing said light energy in said 4000 to 5700 A. wavelength range and transferring said absorbed light energy to said combination to activate and accelerate the polymerization of said monomer.

2. A system according to claim 1 in which the first photo-oxidant dye is a phenothiazine dye.

3. A system according to claim 1 in which the activator dye is selected from the group consisting of eriochrome cyanine R, rhodamine B, acridine red and mixtures thereof.

4. A system according to claim 3 wherein the first said photo-oxidant dye is selected from the group consisting of methylene blue, thionine, azure B, methylene green, and mixtures of the same.

5. A system according to claim 3 wherein said catalyst material is selected from at least one of the group consisting of an organo sulfinic compound, a triorgano arsine, a triorgano phosphine, the soluble metal salts and alkyl and aryl esters of sulfinic acids and adducts of a sulfinic acid with an aldehyde.

6. A process of photopolymerizing a photopolymerizable vinyl system which is inactive in the dark and contains:
   a. a catalyst material selected from the group consisting of organic sulfinic compounds, triorgano-substituted arsines and triorgano-substituted phosphines in combination with;
   b. a first photo-oxidant dye weakly absorbing light in a first wavelength range of 4000 to 5700 A. and strongly absorbing light in a second range of from 5700 to 7200 A. to form a photoredox catalyst combination capable of polymerizing said monomers, said photo-oxidant dye being selected from compounds of the formula:

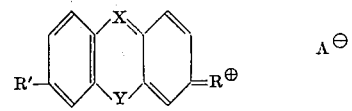

where R carries a positive charge and is selected from imonium, alkylimonium, dialkylimonium and oxonium, R' is selected from hydrogen, amino, alkylamino, dialkylamino, and hydroxyl; X is selected from nitrogen and substituted carbon, Y is selected from sulfur, oxygen and substituted nitrogen and A is an anion; and
   c. an activator for increasing the activity of the redox combination and rate of polymerization of said vinyl monomer in the 4000 to 5700 A. wavelength range comprising a second dye material incapable of forming a photoactive, photoredox catalyst for said monomer in absence of said first dye, but in presence of said first dye and catalyst material combination strongly absorbing said light energy in said 4000 to 5700 A. wavelength range and transferring said absorbed light energy to said combination to activate and accelerate the polymerization of said monomer; which comprises exposing said system to radiation within the range of 3800 to about 7200 A. containing a wavelength component within the range of 4000 to 5700 A. for a period sufficient to effect visible, solid polymerization in said system.

7. A process according to claim 1 in which said activator dye is selected from the group consisting of eriochrome cyanine R, rhodamine B, acridine red and mixtures thereof.

8. A process according to claim 7 in which the photo-oxidant dye is a phenothiazine dye.

9. A process according to claim 7 in which the photo-oxidant dye is selected from the group consisting of methylene blue, thionine, azure B, methylene green and mixtures thereof.

* * * * *